United States Patent [19]

Kwatinetz et al.

[11] Patent Number: 5,574,840
[45] Date of Patent: Nov. 12, 1996

[54] METHOD AND SYSTEM FOR SELECTING TEXT UTILIZING A PLURALITY OF TEXT USING SWITCHABLE MINIMUM GRANULARITY OF SELECTION

[75] Inventors: Andrew Kwatinetz; Antoine Leblond, both of Seattle; G. Christopher Peters, Bellevue; Stephen M. Hirsch, Seattle, all of Wash.

[73] Assignee: Microsoft Corporation, Redmond, Wash.

[21] Appl. No.: 298,219

[22] Filed: Aug. 29, 1994

[51] Int. Cl.⁶ .................................................... G06T 11/60
[52] U.S. Cl. ......................... 395/761; 395/792; 395/326
[58] Field of Search ................................. 395/144, 145, 395/146, 148, 155, 156, 157, 161; 364/419.17

[56] References Cited

PUBLICATIONS

Simpson, *Mastering WordPerfect® 5.1 & 5.2 for Windows*™, SYBEX, 1993, pp. 3. 37–39.
MacDraw II, Claris Corporation, 1988, pp. 149,298–300.

*Primary Examiner*—Heather R. Herndon
*Assistant Examiner*—Stephen Hong
*Attorney, Agent, or Firm*—Seed and Berry LLP

[57] ABSTRACT

An improved method and system for selecting text is provided. In a preferred embodiment of the present invention, a method and system is provided for selecting text utilizing two text selection modes. In the first text selection mode, text is selected with a minimum granularity of a letter. In the second text selection mode, the text is selected with a minimum granularity of a word. The preferred embodiment of the present invention utilizes both text selection modes and determines whether and when to switch between each text selection mode. The preferred embodiment of the present invention determines whether to switch between text selection modes based on user input, mouse movement, and the mouse remaining stationary for more than a predetermined amount of time.

10 Claims, 12 Drawing Sheets

METHOD AND SYSTEM FOR SELECTING TEXT UTILIZING A PLURALITY OF TEXT USING SWITCHABLE MINIMUM GRANULARITY OF SELECTION

FIELD OF THE INVENTION

The present invention relates generally to data processing systems and, more particularly, to the selection of text in data processing systems.

BACKGROUND OF THE INVENTION

In utilizing a word processor, it is often helpful to select text. By selecting text, a user can manipulate blocks of text in aggregate. Such manipulations include cutting, formatting, or deleting the selected text. In conventional application programs, text is selected one letter at a time. That is, text is selected with a minimum granularity of a letter (i.e., the smallest increment of selection is a letter).

FIG. 1 depicts an application program utilizing the conventional method for selecting text, where the application program is the Microsoft Word word processor sold by Microsoft Corporation of Redmond, Wash. The application program is displayed to the user as a window 102 on a video display. Within the window 102, the application program displays text 104 to the user. A portion 106 of the text 104 is selected. The selected text 106 extends from an initial endpoint 108 to the current location where the cursor 110 is located. In this sense, the cursor 110 is a marker of an edit position that indicates where input from the keyboard is reflected. When utilizing the application program, the user may utilize an input device to select the text 104 for manipulation. Such an input device may be a keyboard, a mouse or other pointing device. When the input device is a mouse, the movement of the mouse is reflected on the video display as movement of a mouse indicator. Such a mouse indicator is typically reflected on the video display as an arrow and when the mouse indicator is over text, the mouse indicator is reflected as an i-beam. During text selection, however, the mouse movement is reflected as movement of the cursor 110. Therefore, during text selection, the mouse indicator and the cursor 110 are the same and are reflected as an i-beam on the video display.

When selecting the text, the user points the mouse indicator at a desired location, depresses the mouse button, moves the mouse until the desired text is highlighted, and then releases the mouse button. After releasing the mouse button, all of the desired text is highlighted and can then be manipulated by the user. The initial depression of the mouse button at the desired location acts as an initial endpoint 108 for the selection. This initial endpoint 108 is referred to as the "anchor end" of the selection. As the user moves the cursor 110 across the video display, the text between the cursor and the anchor end 108 is highlighted. The end of the selection that typically moves with the cursor 110 is referred to as the "live end." After releasing the mouse button, the last location of the live end 110 becomes fixed and acts as a final endpoint. Thus, the selected text is the text between the initial endpoint and the final endpoint. Using a conventional method for selecting text, the live end of the selection and the cursor 110 correspond to the same location within the text.

FIG. 2 depicts a flowchart of the steps performed by the conventional method for selecting text. The steps depicted are performed after the mouse button has been depressed. After depressing the mouse button, the conventional method sets the anchor end of the selection and the live end of the selection to the character position where the mouse indicator was located when the mouse button was depressed (step 202). A "character position" refers to the nearest location to the mouse indicator that acts as a boundary between two characters. In this sense, the term "character" includes white space. Therefore, in this step, when the mouse indicator points to a portion of a character and the mouse button is depressed, the anchor end and the live end are located at the nearest character position. The conventional method then receives the mouse coordinates (step 204). The "mouse coordinates" refers to the Cartesian coordinates of the mouse indicator relative to the upper left corner of the video display. Typically, the operating system sends messages to the application program that contain the current location of the mouse indicator and the application program stores the messages in a message queue. Therefore, the application program performs this step by querying the message queue for a message containing the current location of the mouse indicator. After receiving the mouse coordinates, the conventional method determines whether the mouse button is still depressed (step 206). If the mouse button is still depressed, the conventional method extends the live end of the selection to the character position where the mouse indicator is currently located (step 208). That is, the conventional method extends the selection to include the current mouse coordinates. After extending the live end, the conventional method returns to request another set of mouse coordinates. However, in step 206, if the mouse button was not depressed, the text selection has been completed and processing returns. After completing the text selection, the user may then manipulate the text selection.

Selecting text on a letter-by-letter basis allows for precision when selecting text. That is, a user may select a few letters and make changes to only the selected letters. However, users typically work with text on a word-by-word basis. Thus, when a user wants to select a few words for manipulation, the user needs to use caution in selecting the initial endpoint and the final endpoint to ensure that the endpoints correspond to the beginning or end of a word. Oftentimes, although a user intended to select an entire word, the user finds that he has selected only a portion of the word or part of a different word. In either case, the user must select the intended word again. Having to reselect a word makes it more difficult to manipulate text, as well as increasing user frustration.

SUMMARY OF THE INVENTION

In accordance with a first aspect of the present invention, a method is executed in a computer system having a computer program and a mouse input device. The computer program provides for displaying text on a video display and selecting the displayed text and the mouse input device provides for requesting the selection of the displayed text. In accordance with this method of the first aspect of the present invention, the mouse input device requests selection of the text displayed by the computer program and the computer program determines a mode for selecting the text. When the computer program determines to utilize a letter mode, the selection of the text by the computer program is performed with a minimum granularity of a letter. When the computer program determines to utilize word mode, the selection of the text is performed by the computer program with a minimum granularity of a word.

In accordance with a second aspect of the present invention, a device is provided for displaying text and for selecting the displayed text. In accordance with the second aspect of the present invention, the device comprises an input device and a display component. The input device is for inserting endpoints into displayed text. The display component is for displaying the displayed text and for receiving endpoints. The display component further comprises a determination component, a letter mode selection component, and a word mode selection component. The determination component is for determining a mode for selecting displayed text indicated by a first endpoint and a second endpoint. The letter mode selection component is for selecting the displayed text between the first endpoint and the second endpoint when the determined mode is letter mode. The word mode selection component is for selecting the displayed text between the first endpoint and the second endpoint when the determined mode is word mode. Further, the word mode selection component selects a first word when the first endpoint is located within the first word and the word mode selection component selects a second word when the second endpoint is located within the second word.

DETAILED DESCRIPTION OF THE INVENTION

Embodiments of the present invention provide for an improved method and system for selecting text. The preferred embodiment provides for improved text selection by utilizing two text selection modes. In conventional systems, text is selected on a letter-by-letter basis, with a minimum granularity of a letter. This text selection mode is known as "letter select." The present invention can select text using a text selection mode where text is selected on a word-by-word basis, with a minimum granularity of a word ("word select"). In addition, the present invention can switch between text selection modes. This switching between text selection modes facilitates text manipulation by a user and reduces user frustration.

Figure 1:
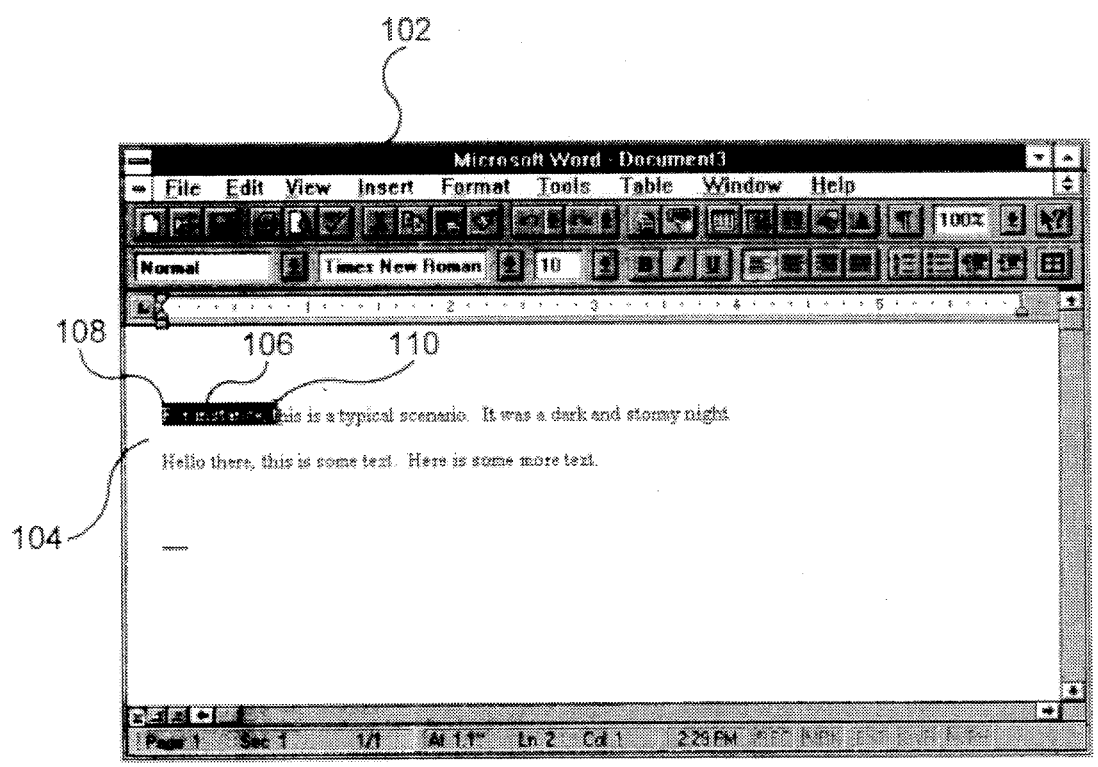
FIG. 1 depicts an application program utilizing a conventional method for selecting text.
Figure 2:
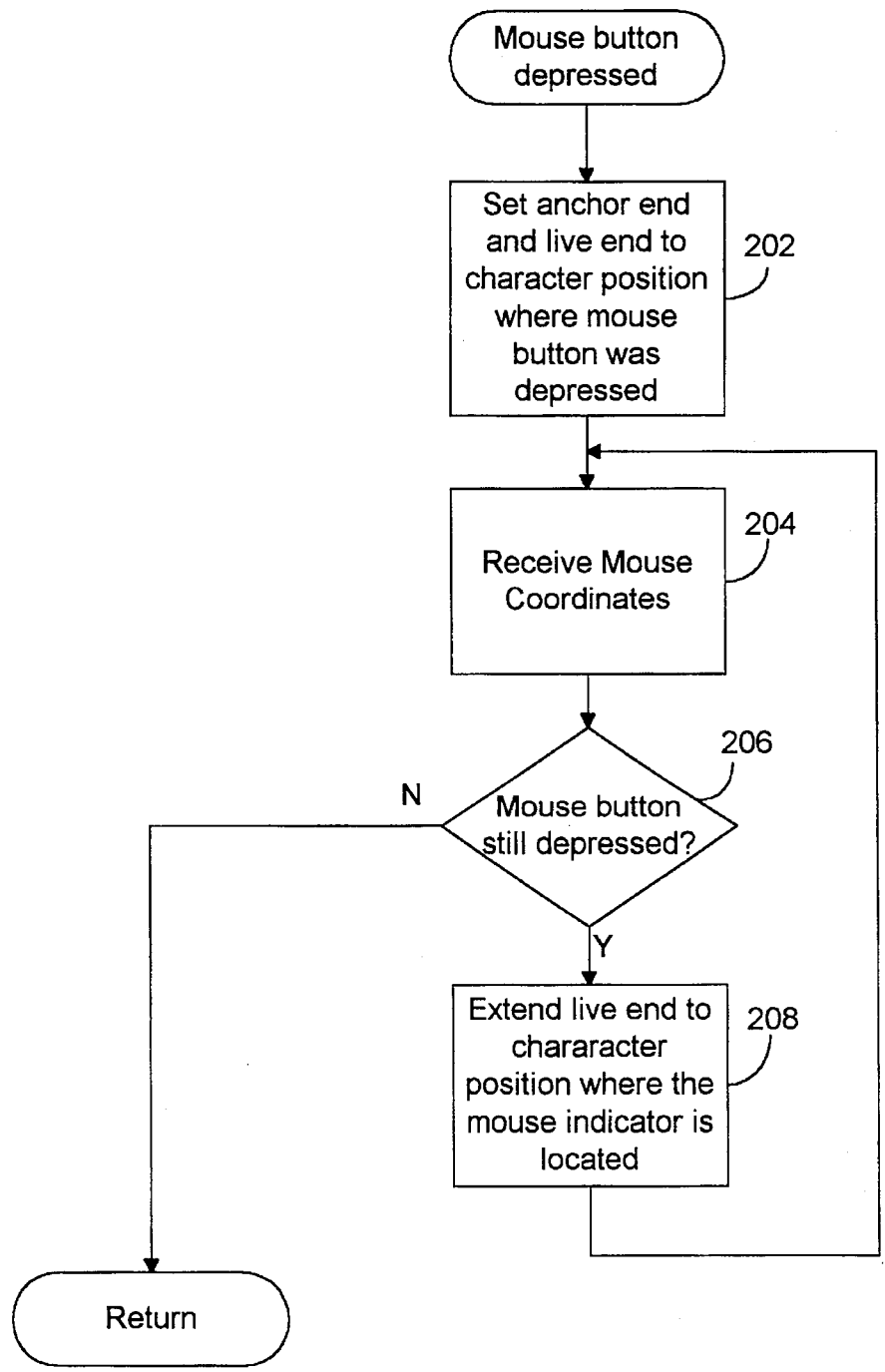
FIG. 2 depicts a flowchart of the steps performed by a conventional method for selecting text.
Figure 3:
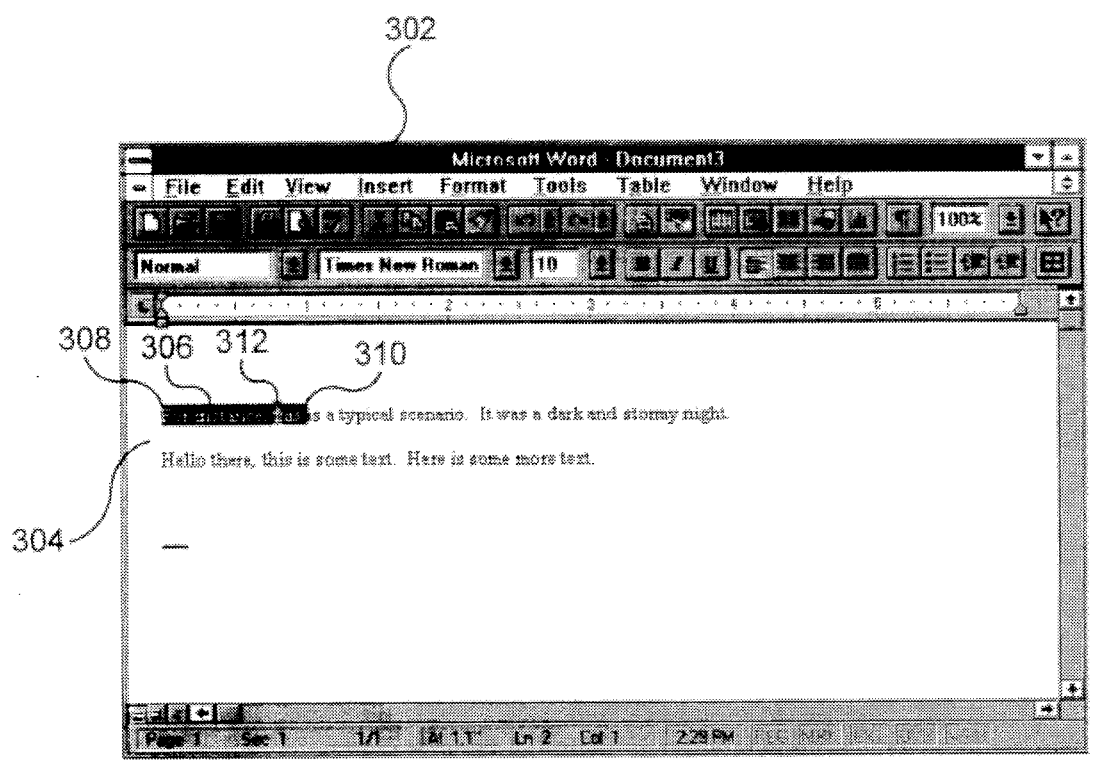
FIG. 3 depicts an example of text selection wherein the text is selected utilizing word select.

An example of word select is depicted in FIG. 3. In FIG. 3, a window 302 of an application program, the Microsoft Word word processor, is displaying text 304. In selecting the text, the user selects a character position within the displayed text 304, the user depresses the mouse button indicating the anchor end 308, and the user moves the mouse with the mouse button depressed, to select the text. As the text 304 is being selected, the live end 310 is moved to the end of each word indicated by the mouse indicator 312. Thus, even though the mouse indicator is located between the "t" and the "h" in the word "this," the live end 310 encompasses the entire word "this." This approach is an improvement over conventional systems since users typically work with text on a word-by-word basis and less frequently manipulate text on a letter-by-letter basis. Therefore, word select facilitates the manipulation of text.

In addition, the present invention switches from word select to letter select upon an indication that the user intends to manipulate the text on a letter-by-letter basis. The present invention performs this switch from word select to letter select based on user input, the movement of the mouse, and the amount of time that the mouse has remained stationary. The user input refers to the user simultaneously depressing the control and shift keys to switch between word select and letter select. The movement of the mouse refers to switching from word select to letter select based on reselecting a word. The phrase "reselecting a word" refers to when the user positions the live end within a first word, the user shrinks the selection so that the live end is positioned in a second word adjacent to the first word, and then the user moves the live end so that it is positioned within the first word again. In other words, the user selects a word, reverses the direction of the selection and then reselects the word. The mouse remaining stationary refers to when the mouse indicator remains in the same character position within the text for more than a predetermined amount of time. A character position actually refers to an area from the middle of one character to the middle of a following character and from a half line below the text to a half line above the text. Therefore, in determining whether the mouse is stationary, the mouse indicator may actually move around within this area as long as it does not move to another character position. The present invention uses the user input, the mouse movement, as well as the mouse remaining stationary to indicate that the user wishes to manipulate the text on a letter-by-letter basis. Therefore, the present invention provides for word select to facilitate the manipulation of words within the text, as well as letter select to facilitate the manipulation of letters within the text.

Figure 4:
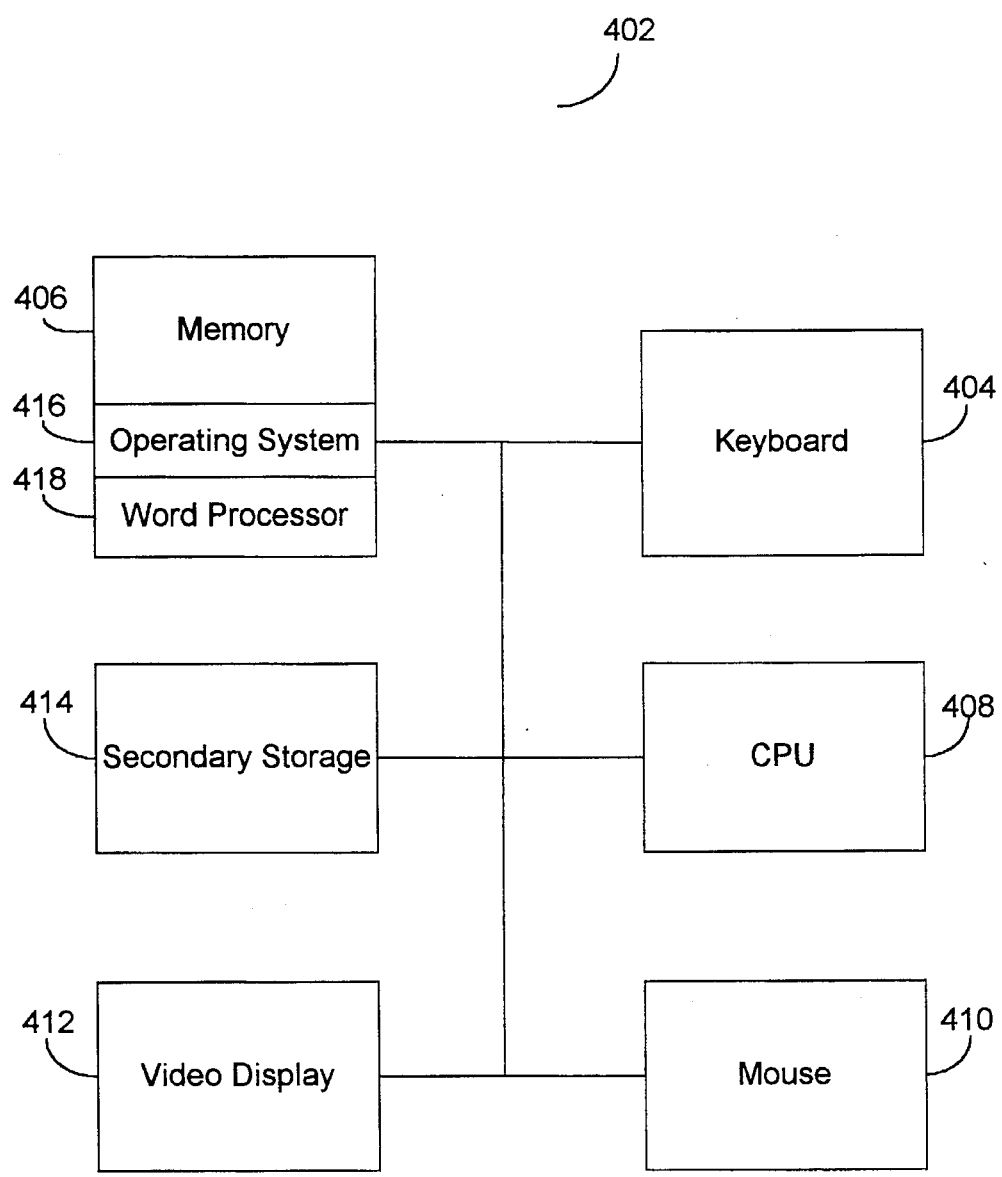
FIG. 4 is a block diagram of a data processing system that is suitable for practicing the preferred/embodiment of the present invention.

FIG. 4 is a block diagram of a data processing system 402 that is suitable for practicing the preferred embodiment of the present invention. The data processing system 402 includes at least one central processing unit (CPU) 408. The CPU 408 is connected to a number of peripheral devices, including a mouse 410, a keyboard 404, and a video display 412. The CPU 408 is also connected to a memory 406 and a secondary storage device 414, such as a hard disk drive. The memory 406 holds a copy of an operating system 416, such as the Microsoft Windows, Version 3.1, operating system sold by Microsoft Corporation of Redmond, Wash. The memory 406 also holds a copy of a word processor 418, such as the Microsoft Word word processor. The implementation of the preferred embodiment of the present invention will be described below with reference to use of text selection within the word processor 418. Nevertheless, it should be appreciated that the text selection may alternatively be implemented in the operating system 416 or as a system resource. In addition, the text selection may be implemented in other application programs including, but not limited to, document processing programs, spreadsheet programs, electronic mail programs, database programs, or any other application program where text can be manipulated by a user.

In general, each application program having a user interface has an associated window procedure for each window that the application program displays. For each application program having a user interface, the operating system maintains a message queue. When an event occurs, the event is translated into a message that is put into the message queue for the application program. Such an event includes keystrokes, timer events, manipulation of the mouse pointer or manipulation of the mouse button. For example, when the mouse button is depressed, a "MOUSE_DOWN" event is generated by the operating system and is sent to the message queue of the application program. The application program retrieves and delivers messages in the message queue to the proper window procedure for processing; that is, the window procedure for the window for which the event is intended. The window procedure, in turn, has a number of functions that the window procedure invokes depending on the specific event that has occurred. For example, the window procedure for the Microsoft Word word processor invokes a "DoContentHit" function when receiving a MOUSE_DOWN event and the mouse indicator is within the text portion of the window. Thus, the DoContentHit function is responsible for handling a MOUSE_DOWN event when the mouse indicator is within the text portion of the window. Since the message queue maintains the messages received from the operating system, during the processing of the DoContentHit routine, the DoContentHit routine can make requests of the message queue to retrieve messages from the message queue.

Figure 5:
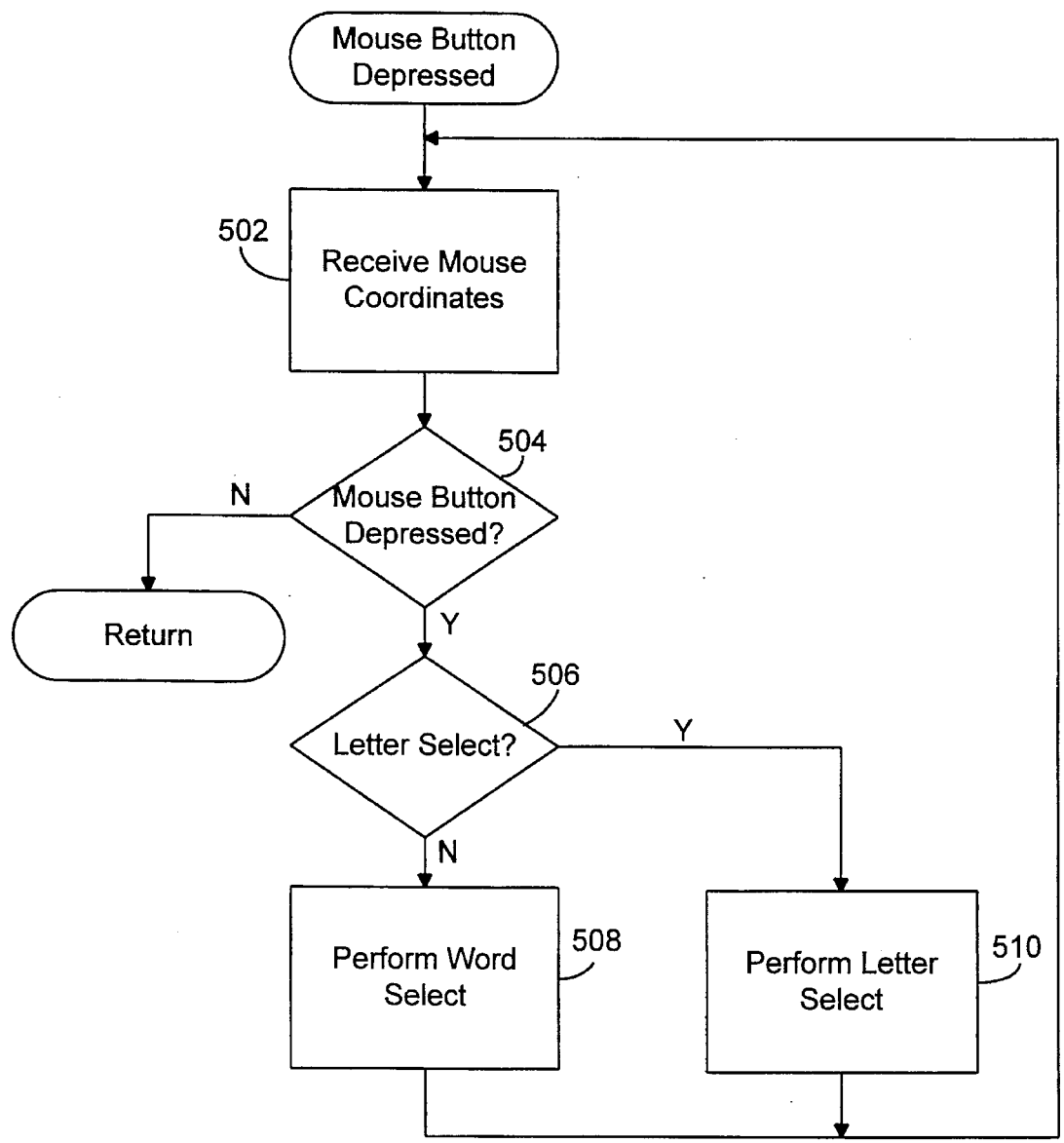
FIG. 5 depicts a high-level flowchart of the steps performed by the DoContentHit routine of the preferred embodiment of the present invention.

FIG. 5 depicts a high-level flowchart of the steps performed by the DoContentHit routine of the present invention. The DoContentHit routine of the present invention is invoked upon a MOUSE_DOWN event when the mouse indicator is within the text portion of the window and determines the appropriate text for selection. The first step performed by the DoContentHit routine is to receive the mouse coordinates (step 502). This step is performed by querying the message queue for the message holding the current mouse coordinates. Then, the DoContentHit routine determines whether the mouse button is depressed (step 504). When the mouse button is not depressed, the text selection has been completed and processing returns. While the mouse button is depressed, the DoContentHit routine determines whether to perform letter select or word select (step 506). This determination is based on user input, mouse movement, and whether the mouse indicator is stationary. Each of these criteria is discussed in more detail below. If the DoContentHit routine determines to perform letter select, the DoContentHit routine performs letter select by selecting the text on a letter-by-letter basis (step 510). However, if the DoContentHit routine determines to perform word select, the DoContentHit routine performs word select by selecting the text on a word-by-word basis (step 508). After determining which text selection mode to perform, the DoContentHit routine returns to receive the current mouse coordinates.

The preferred embodiment of the present invention has three aspects. The first aspect switches between word select and letter select based on user input. The second aspect switches between word select and letter select based on mouse movement (i.e., the reselection of a word). The third aspect switches between word select and letter select based on whether the mouse is stationary for more than a predetermined amount of time. Although each aspect of the preferred embodiment is described separately, one skilled in the art will appreciate that all three aspects can be combined together or in various combinations to perform text selection.

Figure 6A:
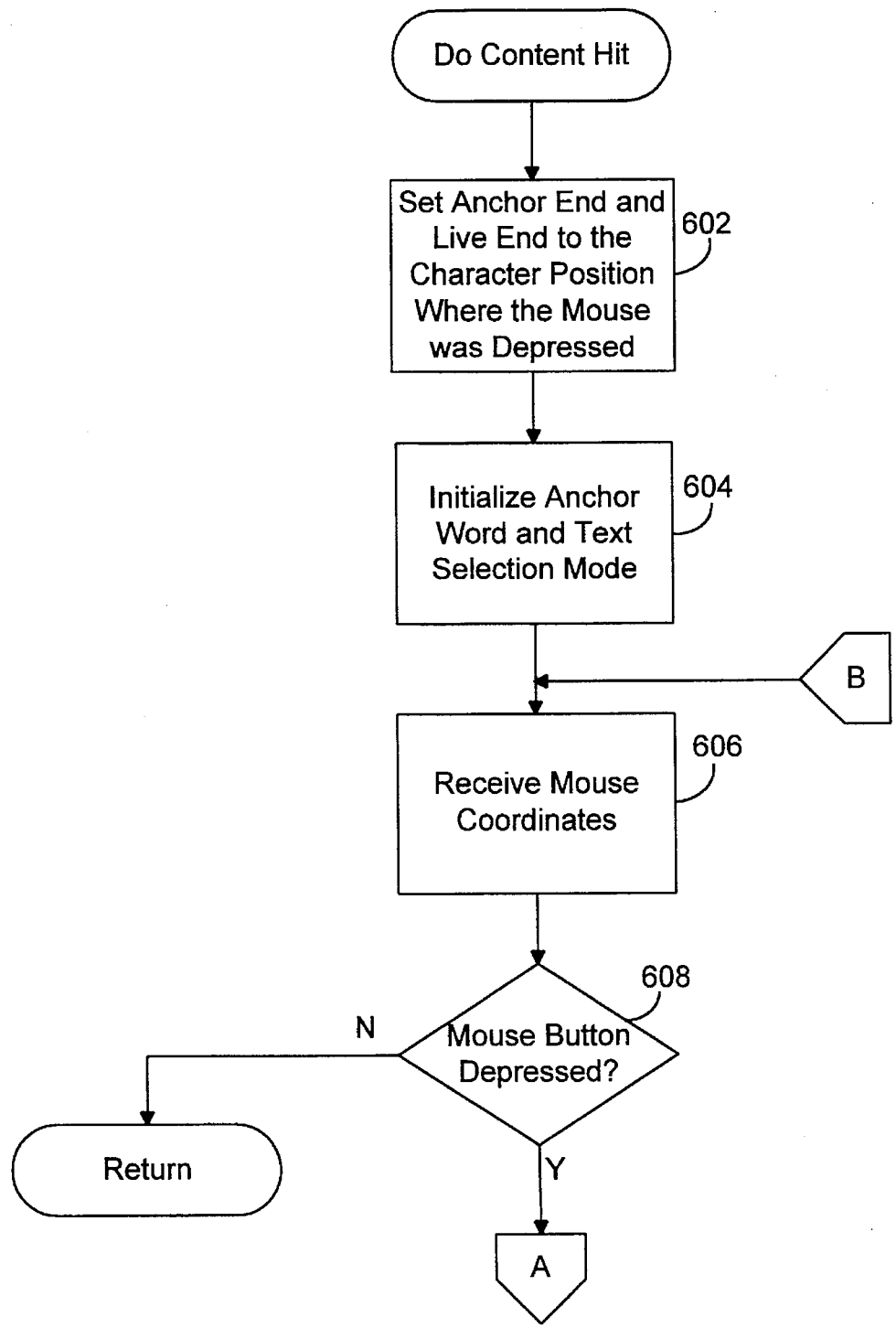
FIGS. 6A and 6B depict a flowchart of the steps performed by a first aspect of the preferred embodiment of the present invention.
Figure 6B:
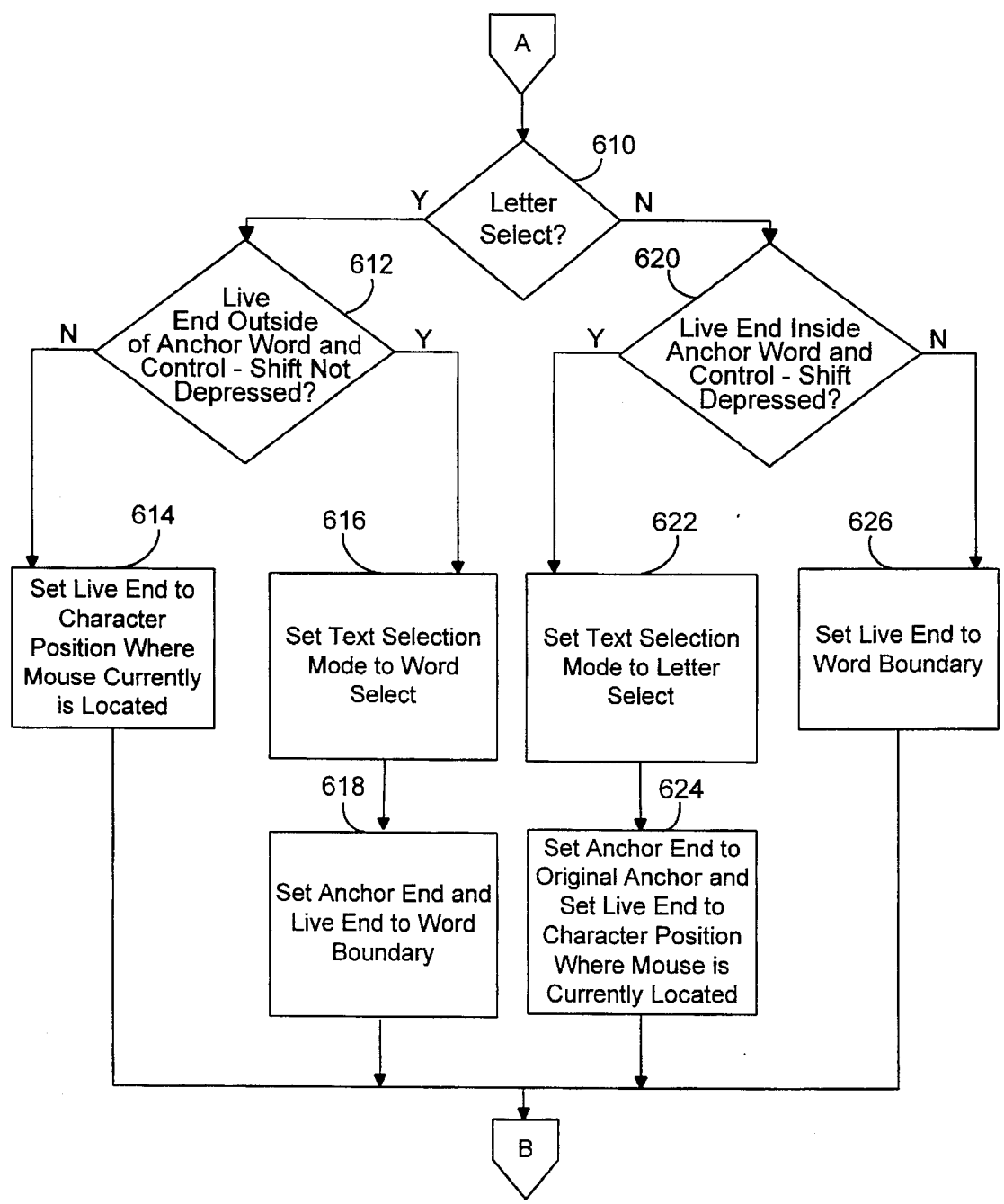

FIGS. 6A and 6B depict a flowchart of the steps performed by the first aspect of the preferred embodiment of the present invention. The first aspect of the preferred embodiment determines whether to perform word select or letter select based on the location of the mouse indicator, as well as user input. The first step performed by the first aspect is to set the anchor end of the selection and the live end of the selection to the character position where the mouse indicator was located when the mouse button was first depressed (step 602 in FIG. 6A). Next, the first aspect initializes the anchor word and the text selection mode (step 604). The anchor word is a variable used as an indication of the word containing the anchor end. The first aspect sets the anchor word to be the word where the mouse indicator was located when the mouse button was first depressed and the text selection mode is set to letter select. The first aspect then receives the mouse coordinates (step 606). The first aspect performs this step by making a request to the message queue for a message containing the mouse coordinates. After receiving the mouse coordinates, the first aspect determines whether the mouse button is depressed (step 608). If the mouse button is not depressed, the text selection has completed and the first aspect returns. However, if the mouse button is depressed, the first aspect determines whether the current text selection mode is letter select (step 610 in FIG. 6B). If the current text selection mode is letter select, the first aspect determines whether the live end of the selection is outside of the anchor word and whether the control and shift keys are not depressed (step 612). If the live end of the selection is outside of the anchor word and the control and shift keys are not depressed, the first aspect switches the text selection mode to word select (step 616). The first aspect then sets the anchor end and live end to the word boundaries (step 618). That is, the anchor end is extended so that the entire anchor word is selected and the live end is extended to the next word boundary, unless the live end is already at a word boundary. A "word boundary" is the division between two words (e.g., the character position between the end of a preceding word and the beginning of a following word). The end of a word is determined by a space or a punctuation mark that follows the word. Any number of spaces following a word are considered to be part of the word. However, one or more punctuation marks following a word are treated as a separate word. If, however, the live end is not outside of the anchor word or the control and shift keys are depressed, the first aspect sets the live end to the character position where the mouse indicator currently is located (step 614). Thus, the first aspect performs letter select. If the text selection mode is set to word select, however, the first aspect determines whether the live end is inside the anchor word or the control and shift keys are depressed (step 620). If the live end is inside the anchor word or the control and shift keys are depressed, the first aspect sets the text selection mode to letter select (step 622). After setting the text selection mode to letter select, the first aspect sets the anchor end to the original anchor end and sets the live end to the character position where the mouse indicator is currently located (step 624). If the live end is not inside the anchor word and the control and shift keys are not depressed, the first aspect sets the live end to the next word boundary, unless the live end is already at a word boundary (step 626). After performing steps 614, 618, 624 or 626, the first aspect continues to step 606 and receives the current mouse coordinates.

Figure 7A:
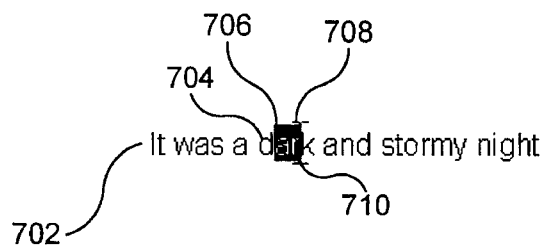
FIGS. 7A, 7B, 7C, 7D, and 7E depict an example text selection performed utilizing the first aspect or the preferred embodiment.
Figure 7B:
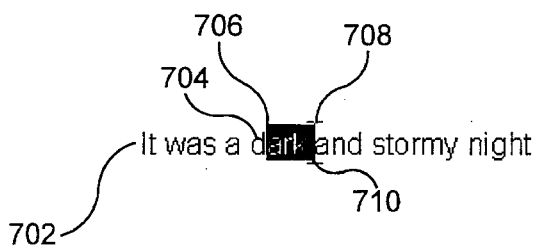
Figure 7C:
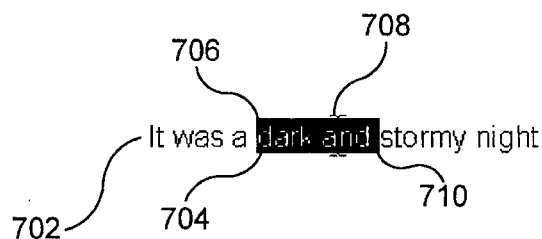
Figure 7D:
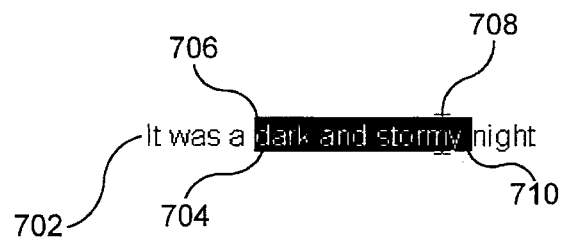
Figure 7E:
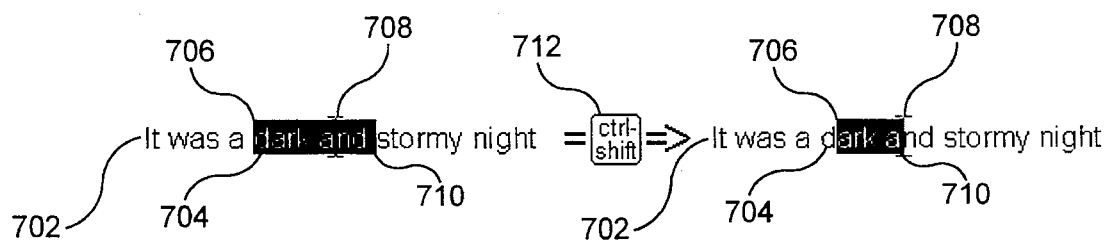

FIGS. 7A, 7B, 7C, 7D, and 7E depict an example of operation of the first aspect of the preferred embodiment. As shown in FIG. 7A, the user is selecting text 702 and has depressed the mouse button at the location between the "d" and the "a" in the word "dark," thus setting the anchor end 706 ("the original anchor end") and determining the anchor word 704. As the user moves the mouse indicator 708 to the right, each letter is selected on a letter-by-letter basis as indicated by the live end 710. Each selected letter is highlighted as it is selected. As shown in FIG. 7B, until reaching the next word boundary after the anchor word, no change occurs in the text selection mode. However, as shown in FIG. 7C, when the mouse indicator 708 moves past the beginning of the next word, the live end 710 moves to select the entire next word (i.e., up to the next word boundary) and the anchor end 706 moves to select the entire anchor word 704. Therefore, the first aspect has switched text selection mode from letter select to word select. As shown in FIG. 7D, word select mode continues for all subsequent words. As shown in FIG. 7E, if the user depresses the control and the shift keys 712 simultaneously, the text selection mode switches from word select to letter select. When this occurs, the anchor end 706 is set to the original anchor end and the live end 710 is set to the character position where the mouse indicator is currently located.

Figure 8A:
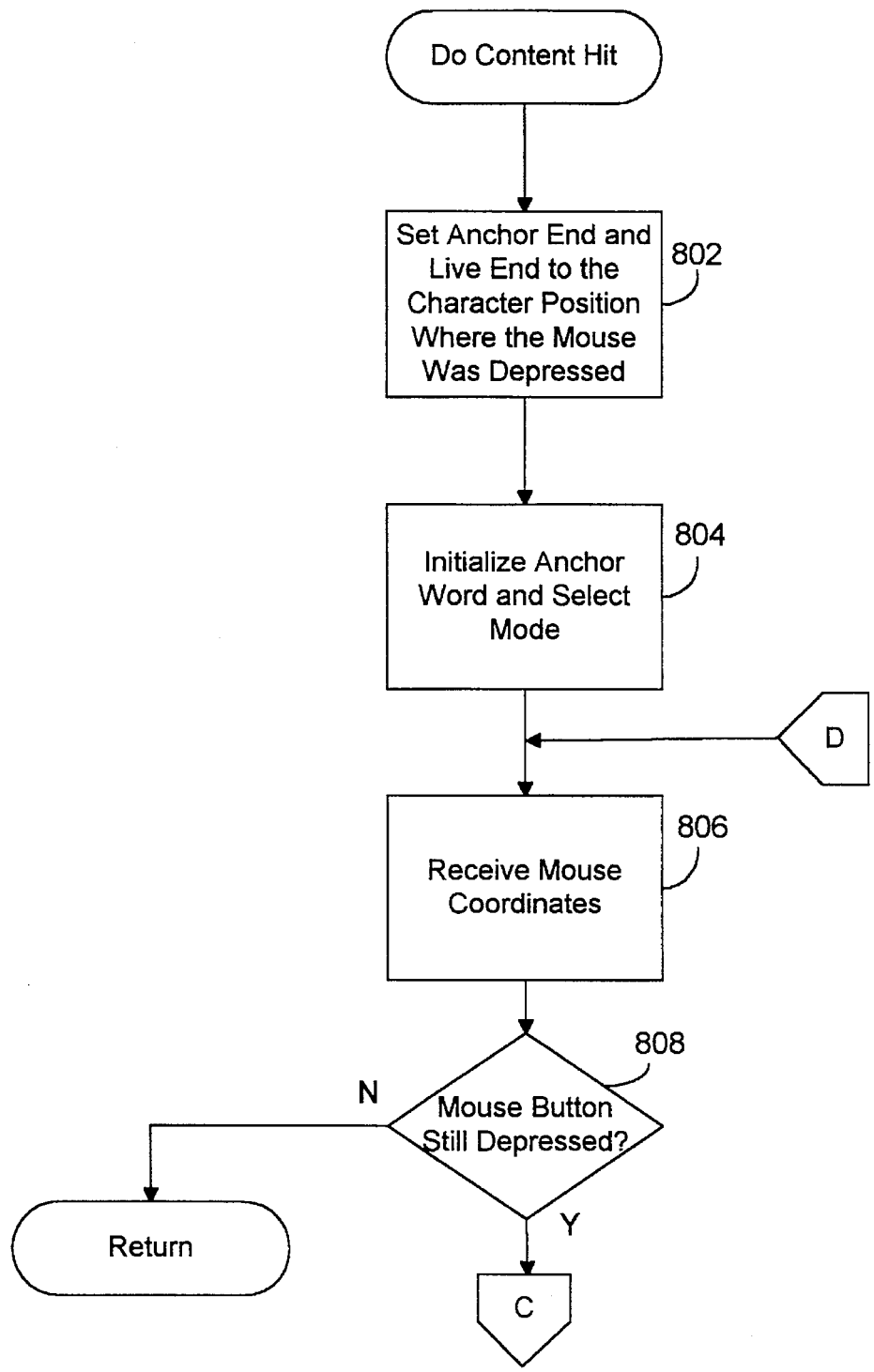
FIGS. 8A and 8B depict a flowchart of the steps performed by the second aspect of the preferred embodiment of the present invention.
Figure 8B:
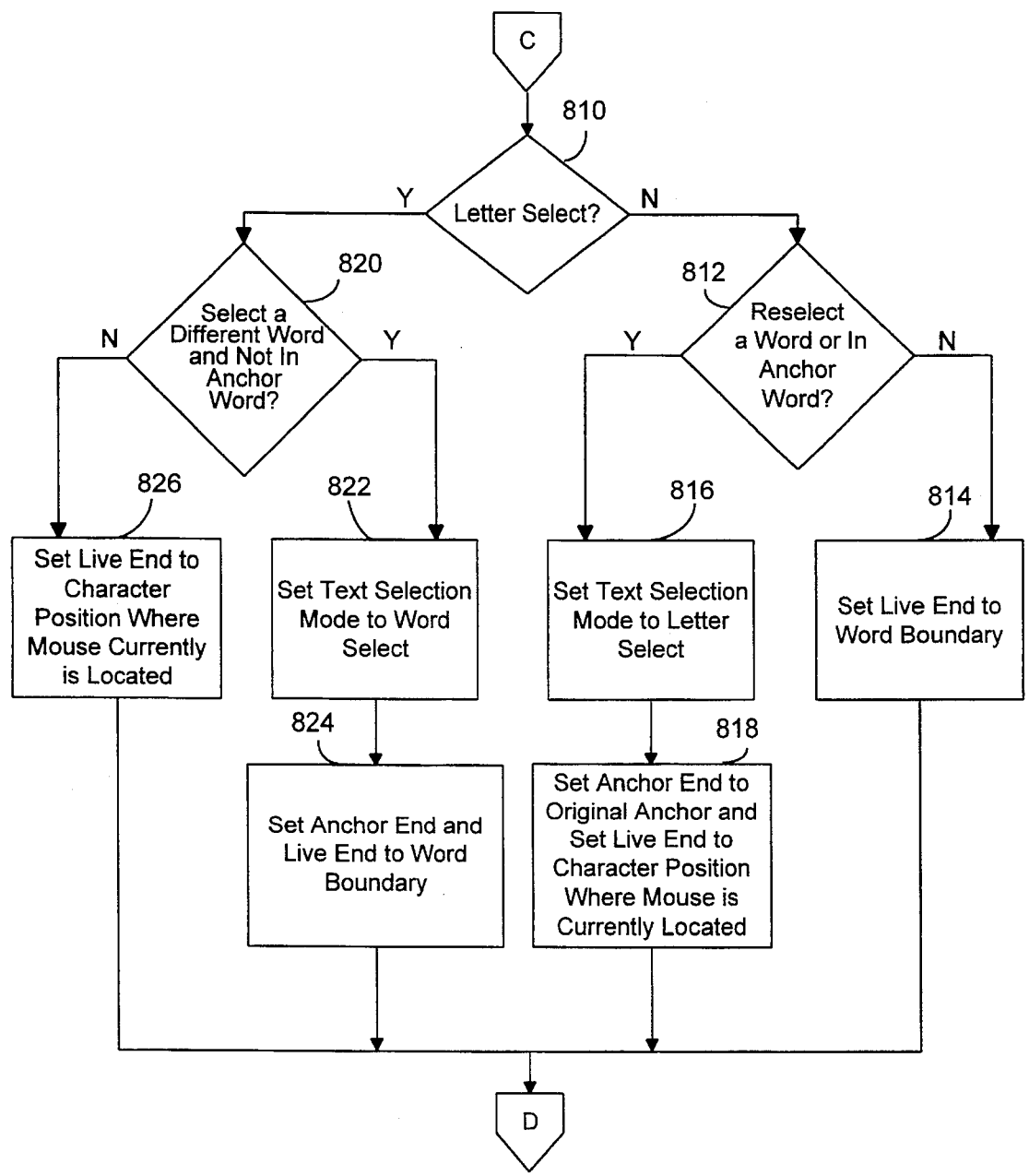

FIGS. 8A and 8B depict a flowchart of the steps performed by the second aspect of the preferred embodiment of the present invention. The second aspect of the preferred embodiment determines whether to perform word select or letter select based on the movement of the mouse. That is, the second aspect determines whether to perform word select or letter select based on whether the user has reselected a word. In steps 802–810, the second aspect initially sets the anchor end, the live end, the anchor word and the text selection mode. In addition, the second aspect receives the mouse coordinates, determines whether the mouse button is depressed and then determines which text selection mode is in effect. Steps 802–810 perform similar processing as that described relative to steps 602–610 of FIGS. 6A and 6B. If the second aspect, in step 810 of FIG. 8B, determines that the text selection mode is word select, the second aspect determines whether the user has reselected a word or whether the live end is within the anchor word (step 812). When the user reselects a word, the second aspect assumes that the user is trying to select individual letters within the word. If the user reselected a word or the live end is within the anchor word, the second aspect switches the text selection mode to letter select (step 816). After setting the text selection mode to letter select, the second aspect sets the anchor end to the original anchor end and sets the live end to the character position where the mouse indicator is currently located (step 818). However, if the user has not reselected a word and the live end is not in the anchor word, the second aspect sets the live end to the next word boundary, unless the live end is currently located at a word boundary (step 814). Thus, this step continues to perform word select.

If the second aspect determines that the text selection mode is letter select, the second aspect determines whether the user has moved the mouse indicator to select a different word and whether the live end is not located within the anchor word (step 820). In this step, the second aspect determines whether a word other than the reselected word of step 812 has been selected. If the user has selected a different word and the live end is not in the anchor word, the second aspect sets the text selection mode to word select (step 822) and sets the anchor end and the live end to word boundaries (step 824). In this step, the anchor end is extended to encompass the entire anchor word and the live end is extended to the next word boundary, unless the live end is already at a word boundary. If, however, the user has not selected a different word or the live end is in the anchor word, the second aspect sets the live end to the character position where the mouse indicator currently is located (step 826). After performing step 814, 818, 824, or 826, the second aspect proceeds to step 806 and receives the current mouse coordinates.

Figure 9A:
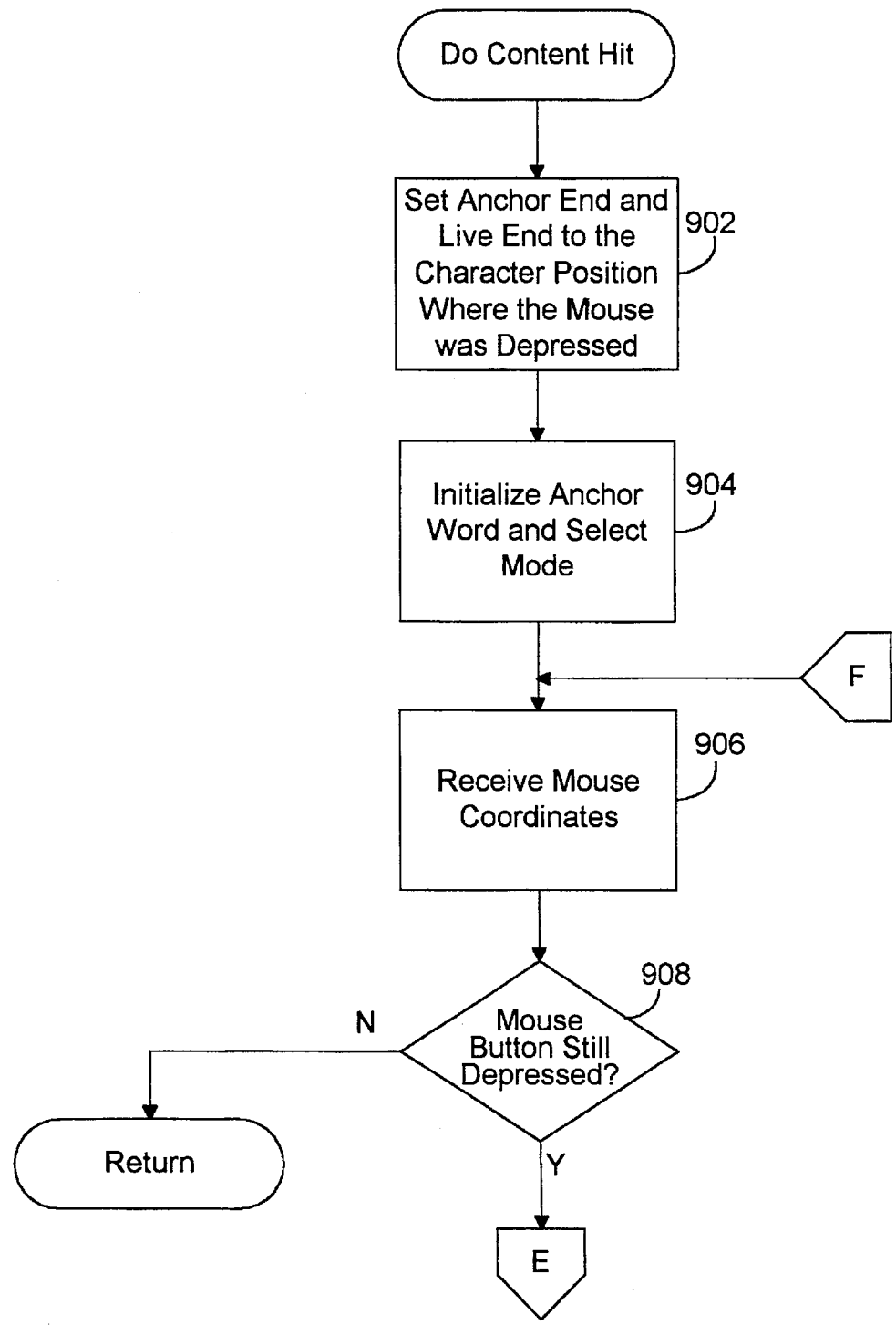
FIGS. 9A and 9B depict a flowchart of the steps performed by the third aspect of the preferred embodiment of the present invention.
Figure 9B:
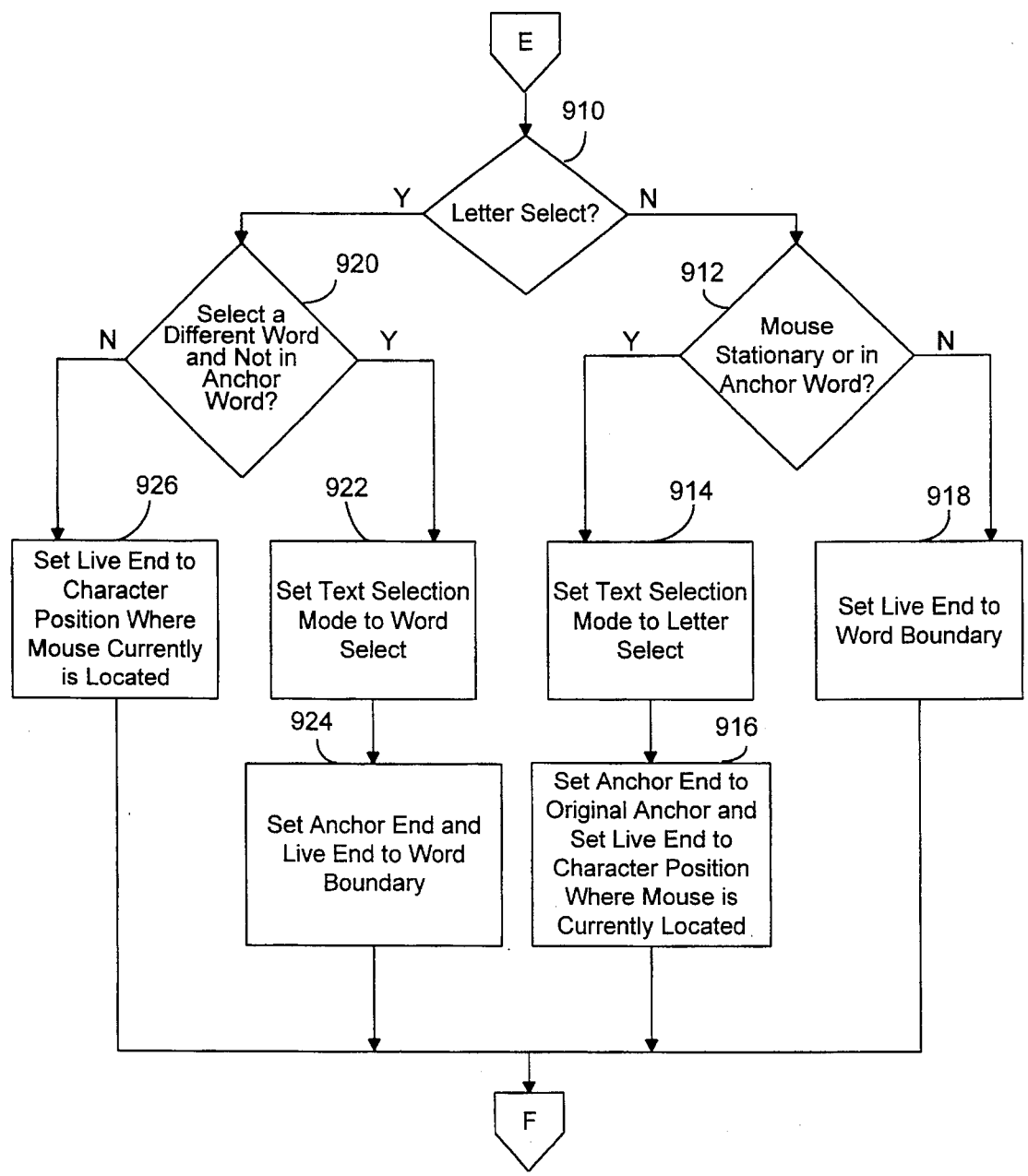

FIGS. 9A and 9B depict a flowchart of the steps performed by the third aspect of the preferred embodiment of the present invention. The third aspect of the preferred embodiment determines whether to perform word select or letter select based on the mouse remaining stationary for more than a predetermined amount of time. That is, the third aspect determines whether the mouse indicator has not moved from a character position for more than a predetermined amount of time. Since the third aspect bases its decision on the time and the distance traveled by the mouse indicator, this determination can also be viewed as a determination based on speed or velocity. Thus, one skilled in the art will recognize that although the third aspect is described as switching text selection modes based on time, the third aspect can base its determination on the distance, the speed or the velocity of the mouse indicator.

In steps 902–910, the third aspect initially sets the anchor end, the live end, the anchor word and the text selection mode. In addition, the third aspect receives the mouse coordinates, determines whether the mouse button is depressed and then determines which text selection mode is in effect. The processing of steps 902–910 is similar to that as described relative to steps 602–610 of FIGS. 6A and 6B. If the text selection mode is determined to be word select, in step 910 of FIG. 9B, the third aspect determines whether the mouse has been stationary for more than a predetermined amount of time and whether the live end is in the anchor word (step 912). In this step, the third aspect sets a timer by utilizing a facility provided by the operating system. In addition, the third aspect stores the mouse coordinates of the last location of the mouse. Every time this step is executed, the third aspect determines whether the mouse indicator has moved to a new character position by examining the current mouse coordinates with the stored mouse coordinates. If the third aspect determines that the mouse indicator has moved to a new character position, the timer is reset. However, if the third aspect determines that the mouse indicator has not moved to a new character position, the third aspect continues processing and returns to this step at a later time. When the third aspect executes this step and the timer has expired, the third aspect compares the stored mouse coordinates with the current mouse coordinates to determine whether the mouse indicator has moved to a different character position. If the mouse indicator has not moved to a different character position, the third aspect determines that the mouse indicator has been stationary for more than a predetermined amount of time. If the mouse has been stationary for more than a predetermined amount of time or if the live end is in the anchor word, the third aspect sets the text selection mode to letter select (step 914) and then sets the anchor end to the original anchor end and sets the live end to the character position where the mouse indicator is currently located (step 916). The predetermined amount of time of the third aspect is 1.5 seconds. This predetermined amount of time has been empirically proven to indicate that a user is trying to select individual letters of a word. Although a specific time has been described for the predetermined amount of time, one skilled in the art will appreciate that different amounts of time may be used. If, however, the mouse has not been stationary for more than a predetermined amount of time and the live end is not in the anchor word, the third aspect sets the live end to the next word boundary, unless the live end is currently located at a word boundary (step 918).

If the third aspect determines that the text selection mode is letter select, the third aspect determines whether a different word has been selected and whether the live end is not in the anchor word (step 920). That is, whether a word other than the word where the mouse remained stationary in step 912 has been selected. If the user has selected a different word other than the word where the mouse was located when the mouse was stationary, and the live end is not in the anchor word, the third aspect sets the text selection mode to word select (step 922) and sets the anchor end and the live end to the word boundaries (step 924). In this step, the anchor end is set to encompass the entire anchor word and the live end is set to the next word boundary, unless the live end is at a word boundary. If, however, the user did not select a different word, the third aspect sets the live end to the character position where the mouse indicator is currently located (step 926). After performing step 916, 918, 924, or 926, processing continues to step 906 to receive the current mouse coordinates.

Although the three aspects of the preferred embodiment of the present invention have described the word select text selection mode as extending both the live end and the anchor end of the selection to a word boundary, one skilled in the art will appreciate that word select can be implemented to extend only one of the ends. That is, in accordance with the present invention, word select may be implemented so as to only extend the live end or the anchor end to a word boundary.

While the present invention has been described with reference to a preferred embodiment thereof, those skilled in the art will appreciate that various changes in form and detail may be made without departing from the intended scope of the present invention as defined in the appended claims.

We claim:

1. In a computer system having a computer program for displaying text on a video display and for selecting the displayed text according to a minimum granularity such that the selection of the displayed text occurs in units of the minimum granularity and a mouse input device having a mouse button for requesting selection of the displayed text, the text comprising a plurality of words, each word having at least one letter, the computer program having a plurality of modes for selecting the text, a first of the modes being letter mode wherein the text selection has a minimum granularity of a letter, a second of the modes being word mode wherein the text selection has a minimum granularity of a word, a method for selecting text comprising the steps of:

receiving a request to select text in response to a user depressing the mouse button without releasing the mouse button;

while the mouse button remains depressed,
determining a mode for selecting the text by the computer program by determining whether the mouse input device has been stationary for more than a predetermined amount of time;

when the mouse input device has been stationary for more than the predetermined amount of time, determining to utilize letter mode;

when the mouse input device has not been stationary for more than a predetermined amount of time, determining to utilize word mode;

when the computer program determines to utilize letter mode,
selecting the text utilizing letter mode; and when the computer program determines to utilize word mode,
selecting the text utilizing word mode.

2. In a computer system having a computer program for displaying text on a video display and for selecting the displayed text according to a minimum granularity such that the selection of the displayed text occurs in units of the minimum granularity and a mouse input device having a mouse button for requesting selection of the displayed text, wherein the mouse input device moves with a speed, the text comprising a plurality of words, each word having at least one letter, the computer program having a plurality of modes for selecting the text, a first of the modes being letter mode wherein the text selection has a minimum granularity of a letter, a second of the modes being word mode wherein the text selection has a minimum granularity of a word, a method for selecting text comprising the steps of:

receiving a request to select text in response to a user depressing the mouse button without releasing the mouse button;

while the mouse button remains depressed,
determining a mode for selecting the text by the computer program by determining whether the speed of the mouse input device is less than a predetermined speed;

when the speed is less than the predetermined speed, determining to utilize letter mode;

when the speed is not less than the predetermined speed,
determining to utilize word mode;

when the computer program determines to utilize letter mode,
selecting the text utilizing letter mode; and when the computer program determines to utilize word mode,
selecting the text utilizing word mode.

3. In a computer system having a computer program for displaying text on a video display, for receiving endpoints that specify a beginning of a text selection and an end of the text selection, and for selecting the displayed text between two endpoints and an input device for inserting the endpoints into the displayed text, the displayed text comprising a word and having character positions, the endpoints corresponding to character positions within the displayed text, the computer program selecting the displayed text according to a mode, a first mode being word mode wherein the selected text does not contain a partial word, a method for selecting text comprising the steps of:

designating a first endpoint into a first character position in the text by the input device;

designating a second endpoint into a second character position in the text by the input device after inserting the first endpoint;

determining whether to utilize word mode for selecting the text by the computer program in response to designating the first endpoint and designating the second endpoint; and when the computer program determines to utilize word mode, when the first endpoint is located within a first word, moving the first endpoint to a new location to select the first word; and when the second endpoint is located within a second word, moving the second endpoint to a new location to select the second word.

4. In a computer system having a computer program for manipulating text, for receiving endpoints and for selecting the text between two endpoints and an insertion component for inserting the endpoints into the text, a first of the endpoints indicating a beginning of selected text, a second of the endpoints indicating an end of the selected text, the text comprising a word and having character positions, each word having word boundaries, the endpoints corresponding to character positions within the text, the computer program selecting the text according to a mode, a first mode being word mode wherein the selected text does not contain a partial word, a method for selecting text comprising the steps of:

inserting the first endpoint into the text by the insertion component;

inserting the second endpoint into the text by the insertion component after inserting the first endpoint;

determining whether to utilize word mode for selecting the text by the computer program in response to inserting the first endpoint and inserting the second endpoint; and when the computer program determines to utilize word mode, when the first endpoint is located within a first word, relocating the first endpoint to a word boundary of the first word; and when the second endpoint is located within a second word, relocating the second endpoint to a word boundary of the second word.

5. In a computer system having a computer program for displaying text on a video display, for receiving a request to set an anchor end indicating a beginning of selected text, for receiving a request to set a live end indicating an end of the selected text, for setting the anchor end and the live end and for selecting the text between the anchor end and the live end, the text comprising a word and having character positions, each word having word boundaries, the anchor end and the live end corresponding to character positions within the text, the computer system having an insertion component for manipulation by a user and for requesting a first character position for the anchor end and a second character position for the live end, the word containing the requested first character position being an anchor word, the computer program selecting the text according to a mode, a first mode being letter mode wherein the computer program sets the anchor end to the requested first character position of the insertion component and wherein the computer program sets the live end to the requested second character position of the insertion component, a second mode being word mode wherein the computer program extends the anchor end from the first requested character position and sets the anchor end to a first encountered word boundary and wherein the computer program extends the live end from the second requested character position to a first encountered word boundary, a method for selecting text comprising the steps of:

requesting the first character position for the anchor end by the insertion component;

requesting the second character position for the live end by the insertion component in response to requesting the first character position;

determining whether the user has input a predetermined sequence of keystrokes by the computer program in response to the insertion component requesting the second character position;

determining whether the second character position is within the anchor word in response to determining whether the user has input a predetermined sequence of keystrokes;

when the second character position is within the anchor word, selecting the text utilizing letter mode;

when the user has input the predetermined sequence of keystrokes, selecting the text utilizing letter mode and;

when the second character position is not within the anchor word and the user has not input the predetermined sequence of keystrokes, selecting the text utilizing word mode.

6. The method of claim 5 wherein the computer program is a word processor.

7. In a computer system having a computer program for displaying text on a video display, for receiving a request to set an anchor end indicating a beginning of selected text, for receiving a request to set a live end indicating an end of the selected text, for setting the anchor end and the live end and for selecting the text between the anchor end and the live end, the text comprising a word and having character positions, each word having word boundaries, the anchor end and the live end corresponding to character positions within the text, the computer system having an insertion component for manipulation by a user and for requesting a first character position for the anchor end and a second character position for the live end, the word containing the requested first character position being an anchor word, the computer program selecting the text according to a mode, a first mode being letter mode wherein the computer program sets the anchor end to the requested first character position of the insertion component and wherein the computer program sets the live end to the requested second character position of the insertion component, a second mode being word mode wherein the computer program extends the anchor end from the first requested character position and sets the anchor end to a first encountered word boundary and wherein the computer program extends the live end from the second requested character position to a first encountered word boundary, a method for selecting text comprising the steps of:

requesting the first character position for the anchor end by the insertion component;

requesting the second character position for the live end by the insertion component in response to requesting the first character position;

determining whether the insertion component is selecting the word containing the second character position for at least a second time since the request for the first character position in response to the insertion component requesting the second character position;

determining whether the second character position is within the anchor word in response to determining whether the word containing the second character position is being selected for at least a second time;

when the second character position is not within the anchor word and the insertion component is not selecting the word containing the second character position for at least a second time,
selecting the text utilizing word mode;
when the second character position is within the anchor word,
selecting the text utilizing letter mode; and
when the word containing the second character position is being selected for at least a second time,
selecting the text utilizing letter mode.

8. The method of claim 7 wherein the computer program is a word processor.

9. In a computer system having a computer program for displaying text on a video display, for receiving a request to set an anchor end indicating a beginning of selected text, for receiving a request to set a live end indicating an end of the selected text, for setting the anchor end and the live end and for selecting the text between the anchor end and the live end, the text comprising a word and having character positions, each word having word boundaries, the anchor end and the live end corresponding to character positions within the text, the computer system having an insertion component for manipulation by a user, for referring to character positions in the text, for requesting a first character position for the anchor end and for requesting a second character position for the live end by referring to the second character position, the word containing the requested first character position being an anchor word, the computer program selecting the text according to a mode, a first mode being letter mode wherein the computer program sets the anchor end to the requested first character position of the insertion component and wherein the computer program sets the live end to the requested second character position of the insertion component, a second mode being word mode wherein the computer program extends the anchor end from the first requested character position and sets the anchor end to a first encountered word boundary and wherein the computer program extends the live end from the second requested character position to a first encountered word boundary, a method for selecting text comprising the steps of:

requesting the first character position for the anchor end by the insertion component;

requesting the second character position for the live end by the insertion component referring to the second character position in response to requesting the first character position;

determining an amount of time that the insertion component referred to the second character position by the computer program;

determining whether the determined amount of time is more than a predetermined amount of time;

determining whether the second character position is within the anchor word in response to determining whether the determined amount of time is more than the predetermined amount of time;

when the second character position is not within the anchor word and the determined amount of time is not more than the predetermined amount of time,
selecting the text utilizing word mode;

when the second character position is within the anchor word,
selecting the text utilizing letter mode; and when the determined amount of time is more than the predetermined amount of time,
selecting the text utilizing letter mode.

10. The method of claim 9 wherein the computer program is a word processor.

* * * * *

UNITED STATES PATENT AND TRADEMARK OFFICE
CERTIFICATE OF CORRECTION

PATENT NO. : 5,574,840
DATED : November 12, 1996
INVENTOR(S) : Andrew Kwatinetz, Antione Leblond, G. Christopher Peters, and Stephen M. Hirsch It is certified that error appears in the above-indentified patent and that said Letters Patent is hereby corrected as shown below:

On the title page, item [54] and Col. 1;

Title: "Method and System for Selecting Text Utilizing a Plurality of Text Selection Modes"

Signed and Sealed this

Twenty-first Day of October 1997

Attest:

BRUCE LEHMAN

Attesting Officer

Commissioner of Patents and Trademarks